United States Patent [19]
Lhoest

[11] Patent Number: 5,946,217
[45] Date of Patent: Aug. 31, 1999

[54] INSTALLATION FOR TRANSPORTING CONTAINERS FOR PRODUCTS FLOWING BY GRAVITY

[75] Inventor: Willy Lhoest, Brussels, Belgium

[73] Assignee: Elveco MSJ S.A., Brussels, Belgium

[21] Appl. No.: 08/696,171

[22] Filed: Aug. 13, 1996

[51] Int. Cl.⁶ .............................. G06F 17/00; G06G 7/48
[52] U.S. Cl. ................. 364/478.16; 364/478.17; 364/478.18; 364/479.09; 364/479.13
[58] Field of Search ............... 364/478.01, 478.02, 364/478.05, 478.07, 478.16, 478.17, 478.18, 479.01, 479.09, 479.1–479.13, 479.14; 414/266–268, 272–274, 277–286

[56] References Cited

U.S. PATENT DOCUMENTS

| | | | |
|---|---|---|---|
| 4,525,071 | 6/1985 | Horowitz et al. | 364/474.14 |
| 4,554,955 | 11/1985 | von Lersner et al. | 364/479.09 |
| 5,144,992 | 9/1992 | Jaeger et al. | 141/346 |
| 5,333,983 | 8/1994 | Hatouchi et al. | 364/478.02 |
| 5,335,601 | 8/1994 | Matsumoto et al. | 364/478.16 |
| 5,490,546 | 2/1996 | Lhoest | 141/346 |
| 5,522,309 | 6/1996 | Mizobuchi et al. | 364/479.09 |
| 5,582,497 | 12/1996 | Noguchi | 364/478.02 |

FOREIGN PATENT DOCUMENTS

| | | |
|---|---|---|
| 0133472 | 2/1985 | European Pat. Off. . |
| 2348871 | 1/1977 | France . |
| 2696725 | 4/1994 | France . |
| 3933314 | 4/1991 | Germany . |
| 9208819 | 4/1993 | Germany . |

OTHER PUBLICATIONS

Search Report issued for the French National Institute of Industrial Property (INPI) by the European Patent Office (Dec. 22, 1995) 1 page+annex.

Primary Examiner—William Grant
Assistant Examiner—Ramesh Patel
Attorney, Agent, or Firm—Ladas and Parry

[57] ABSTRACT

An automated and possibly computer-driven installation (10, 600) for transporting containers (210) for products flowing by gravity, which is intended for a multi-story production factory, and a device (290) able to carry a container (210) and move independently. The installation (10, 600) includes stations (110a, b) for contamination-free transfer of the products, in the shape of a parallelepiped, open at its lower and upper parts, able to carry, raise or lower a container, and a handling device (150, 610, 615, 540) able to carry and to transport the satellite unit (290) towards a chosen position. The installation is particularly intended for the pharmaceutical industry in which product transfer has to be carried out while avoiding any contamination.

20 Claims, 17 Drawing Sheets

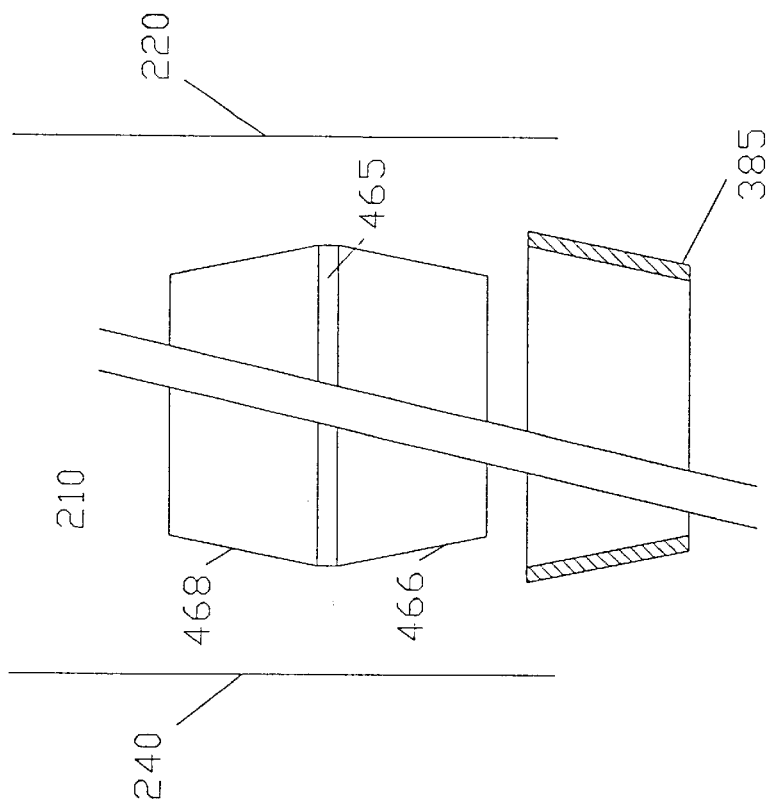
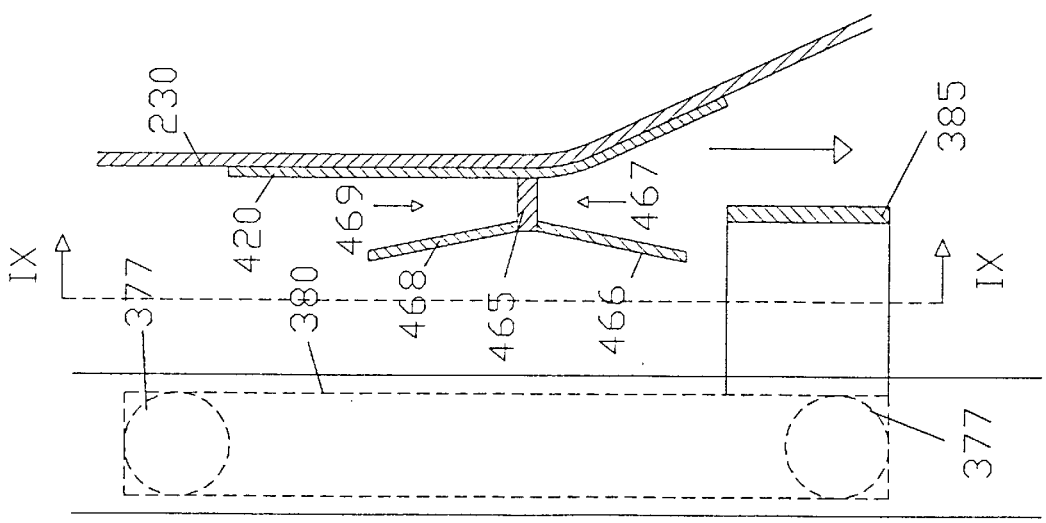

INSTALLATION FOR TRANSPORTING CONTAINERS FOR PRODUCTS FLOWING BY GRAVITY

BACKGROUND OF THE INVENTION

1) Field of the Invention

The present invention relates to automated and possibly computer-driven installations for transporting containers for products flowing by gravity, which installations are intended, in particular, for the pharmaceutical industry, as well as a device able to carry a container and able to move independently.

2) Description of the Prior Art

Pharmaceutical factories of horizontal type are known, in which the various pieces of equipment and premises used for the manufacturing process are essentially arranged on one and the same level. In such factories, the raw materials and the products at the various stages of production are transported in containers of any type (drums, bags, boxes, etc.) generally placed on pallets and moved by vehicles of the forklift truck type, driven by an operator.

Today, such factory concepts are considered as outmoded since they no longer make it possible to satisfy the modern requirements for separation of the various circuits of personnel and of flows of materials, for absence of cross-contamination and for operator protection.

More recent types of factories also exist, which the professional literature currently describes as "Lhoest Type Plants", arranged in several storeys. In these factories, one or more storeys are reserved for production or for processing of pharmaceutical products in which very strict requirements for cleanliness, or even for sterility, are met. These production storeys are sandwiched between storeys known as "technical" storeys which serve not only for fluid and energy distribution, but above all for the transport and storage of the raw materials and of the products in the course of manufacture. In this case, the said materials and products above are enclosed and sealed in standardized containers, which are specially designed for this purpose and which make it possible to feed the production apparatus, using the force of gravity, by virtue of specially designed feed stations situated in the ceiling. Similarly, the products manufactured by the production apparatus flow out by gravity, through reception stations situated in the floor, into standardized containers situated on the lower storey. These factory concepts apply equally to the manufacturing of bulk pharmaceutical forms (tablets, capsules, granules, coated tablets, pellets, syrups, droplets, ointments, etc.) as to their filling and packaging.

These multi-storey factories meet the strictest requirements. They are generally automated, and driven by computer. In such factories, the products in their standardized sealed containers are moved using automatic handling vehicles, in particular automatically guided vehicles, called A.G.V. below (from "Automated Guided Vehicle"), sometimes coupled to handling vehicles called transtockers or stackers (from "stacker cranes"). Despite numerous advantages, A.G.V.s nevertheless exhibit significant drawbacks: they are expensive and heavy (1 to 3 tonnes unladen weight, 2 to 5 tonnes when laden); they can move only on specially designed and perfectly flat floors, endowed with fairly precise electrical conductivity and surface roughness. Their technology is complex and intricate. They require considerable corridors and manoeuvring space in which to circulate. Finally, due to their mass, they lead to a heavier building structure. Consequently, overall, their use is relatively expensive.

BRIEF SUMMARY OF THE INVENTION

The new handling system which is the subject of the present invention is the base of a novel concept of factories. It makes it possible to retain all the technical, financial, legal advantages which the above multi-storey factories provide, but, moreover, it makes it possible to simplify the designs, to lower the construction costs (15–25%), to obtain shorter production cycles and to eliminate the drawbacks related to the use of A.G.V.s.

A device for transferring products flowing by gravity, from upper conduits or containers, to lower conduits or containers, by means of a discharging station, is known from U.S. Pat. No. 5,490,546 of the same applicant. The device makes it possible, at any instant, and in particular during the phases of connecting the container to the discharging station and during the product transfer phases, to achieve leaktightness which is as complete as possible. Any danger of contamination, both of the surrounding atmosphere and of the product transferred, is thus avoided.

This device may, in particular, be applied to the pharmaceutical industry.

An automatic storage warehouse, including a corridor arranged between two metal structures (or "racks") is also known, according to a conventional system. These metal structures are divided into bays (or "cells"), intended to accommodate products which, in the majority of cases, are arranged on pallets. In the corridor, a lifting hoist can be moved in the horizontal plane, on rails. This lifting hoist, called "transtocker", includes a mast, the height of which is approximately equal to the height of the building. The transtocker is equipped with a carriage which can move in the vertical plane. This carriage, generally including telescopic forks, is intended to insert pallets into the racks, these pallets coming from the outside, or to retrieve a pallet in a cell so as to change its location, extract it or put it on a conveyor in order to transport it to a processing site.

In certain cases, the metal structure has a depth equal to the dimension of several pallets. In this case, the carriage is not equipped with forks, but includes a satellite commonly called in French "furet", a small trolley of low height (generally about twenty centimeters), guided by two rails. It moves under the pallet, in the cells of the metal structure, raises the desired pallet and carries it off. Such a satellite ("furet") is generally powered electrically using a cable which remains linked to the carriage and thus to the lifting hoist. It therefore gets its power from the transtocker. This means that, when the satellite ("furet") is in a cell of the metal structure, the transtocker has to wait for it, which constitutes a waste of time, and thus of efficiency. Moreover, this system is limited to handling objects stored on pallets.

A device is also known, from the patent application EP-A-0,133,472, for vertical storage of containers comprising, at each storey of a building, a central corridor, on each side of which is a plurality of storage or warehousing compartments able to accommodate containers. The corridors are provided with horizontal runways equipped with trolleys which make it possible to move the containers along the corridor, and to place them in the compartments or to withdraw them therefrom. At least one end of the corridor is provided with a lifting hoist. This includes its own means of gripping the containers.

This device is able to store containers, but not to transport them to stations for transferring their content in which case, the container has to be connected extremely precisely to the transfer station. This connection is all the more important when the product to be transferred is toxic or is a pharmaceutical product and when it is then vital to avoid any contamination of the atmosphere by the product and to avoid any contamination of the product itself. The device described in Patent Application EP-A-0,133,472 is not equipped with means of positioning the container. This device therefore presupposes no transfer of product flowing by gravity, towards processing premises.

The object of the present invention is to supply a novel concept of an automatic factory, based on a novel means of transporting and transferring containers for products flowing by gravity.

In particular, the object of the present invention is to supply an installation for transporting containers in an industrial complex arranged over several storeys.

A further object of the present invention is to supply such a transport installation which can be adapted particularly to devices for transferring products flowing by gravity which are described in the U.S. Pat. No. 5,490,546.

The subject of the present invention is an automated installation for transporting containers for products flowing by gravity, which is intended for a multi-storeys production factory (particularly a pharmaceutical or food factory or any similar factory), the said installation including:

containers provided with at least one orifice able to be closed, stations for contamination-free transfer of the products through a completely tight floor, at least one satellite unit including a cage of parallelepipedal shape, open at its lower and upper parts, the said satellite unit being able to carry a container and able to raise and lower the said container by virtue of a vertical translation device, in such a way as to allow it to be coupled to the said stations, guidance means able to guide the satellite unit towards the said stations, handling means able to carry and to transport the satellite unit along at least one horizontal axis and along a vertical axis towards a chosen position, an electronic management system able to manage all the movements of the handling means, of the satellite unit and of the containers.

The said coupling system makes it possible to transfer the products, without dust or contamination, whether of the atmosphere or of the products, this transfer being carried out between zones known as technical zones and processing premises, called clean premises, which are separated by impervious walls.

According to a first embodiment of the invention, the said handling means include at least one lifting hoist including a carriage able to move vertically, the lifting hoist or hoists being able to run along a guide element. Advantageously, this guide element means includes a lower rail and, if appropriate, an upper rail.

According to another embodiment, the said handling means include at least one fixed lifting hoist and include several horizontal transport means arranged on different storeys. For preference, the lifting hoist or hoists are arranged at one end of the corridor or at both ends.

In particular, the satellite unit includes a cage of parallelepipedal shape including at least two substantially rectangular walls.

Advantageously, each wall of the cage consists of an assembly of sectional bars forming a frame.

In particular, the satellite unit includes means for gripping the containers and the containers include suspension means able to interact with the said gripping means.

Advantageously, the device for vertical translation of the satellite unit includes at least one chassis sliding along worm screws.

According to a preferred embodiment, the satellite unit includes wheels able to be guided by at least one rail and, in a more preferred way, by two parallel rails.

Advantageously, some of the product transfer stations are either feed stations, through which the product contained in the container is transferred from the container to a processing or weighing premises, or reception stations, through which the product is transferred from a processing or weighing premises to the container.

The reception station preferably includes hooking devices able to interact with suspension devices of the container, so as to maintain the latter in position under the reception station.

The installation according to the invention advantageously includes several reception stations and several feed stations.

In the case of a weighing premises, the reception station must be disengaged in order not to influence the weighing operation.

In particular, the installation also includes parking zones, where one or more containers are placed on standby.

According to one advantageous embodiment of the invention, the handling means include means for transporting the satellite unit, such as a double rolling rail able to interact with the satellite unit or forks.

Advantageously, in addition to the satellite unit, the handling means are also able to transport pallets, simultaneously or otherwise.

According to one particular embodiment of the invention, the system includes detectors of the positioning of the containers with respect to the stations.

According to one embodiment of the invention, some of the containers include an upper orifice able to be engaged in a reception station and a lower orifice able to be engaged in a feed station.

According to another embodiment of the invention, some of the containers are reversible. They then include a single orifice able to be engaged in a reception station or in a feed station. Obviously, the installation according to the invention can include both containers with two orifices and reversible containers, with a single orifice.

A further subject of the present invention is a device able to move independently, including means for gripping a container for products flowing by gravity and including a cage of parallelepipedal shape, open at its lower and upper parts, and including a vertical translation device able to raise or lower the container.

The vertical translation device includes, in particular, worm screws set in motion by the use of a motor and of a drive mechanism assembly, and a chassis equipped with the said means for gripping the container and able to move vertically along the worm screws. The vertical movement of the chassis is, advantageously, guided by slideways.

This device advantageously includes wheels set in motion by a drive system and an actuation system carried on board the device itself.

According to one particular embodiment of the invention, the device includes two sets of wheels allowing it to move along two different horizontal axes.

According to one particular embodiment of the invention, the device is powered by battery installed on board the device itself.

According to another embodiment, the device is powered electrically from wipers sliding along an electrical power supply rail.

A further subject of the present invention is an installation as described above, including at least one device as described above.

BRIEF DESCRIPTION OF THE SEVERAL VIEWS

Various characteristics and advantages of the invention will emerge from the description which will follow of a possible embodiment, reference being made to the attached drawings, in which:

FIG. 8 shows a variant embodiment of a means of gripping a container and of a means of supporting the container on the satellite unit;

FIG. 9 is an interrupted view of FIG. 8 along the sectional plane IX—IX;

DETAILED DESCRIPTION OF THE DRAWINGS

Figure 1:
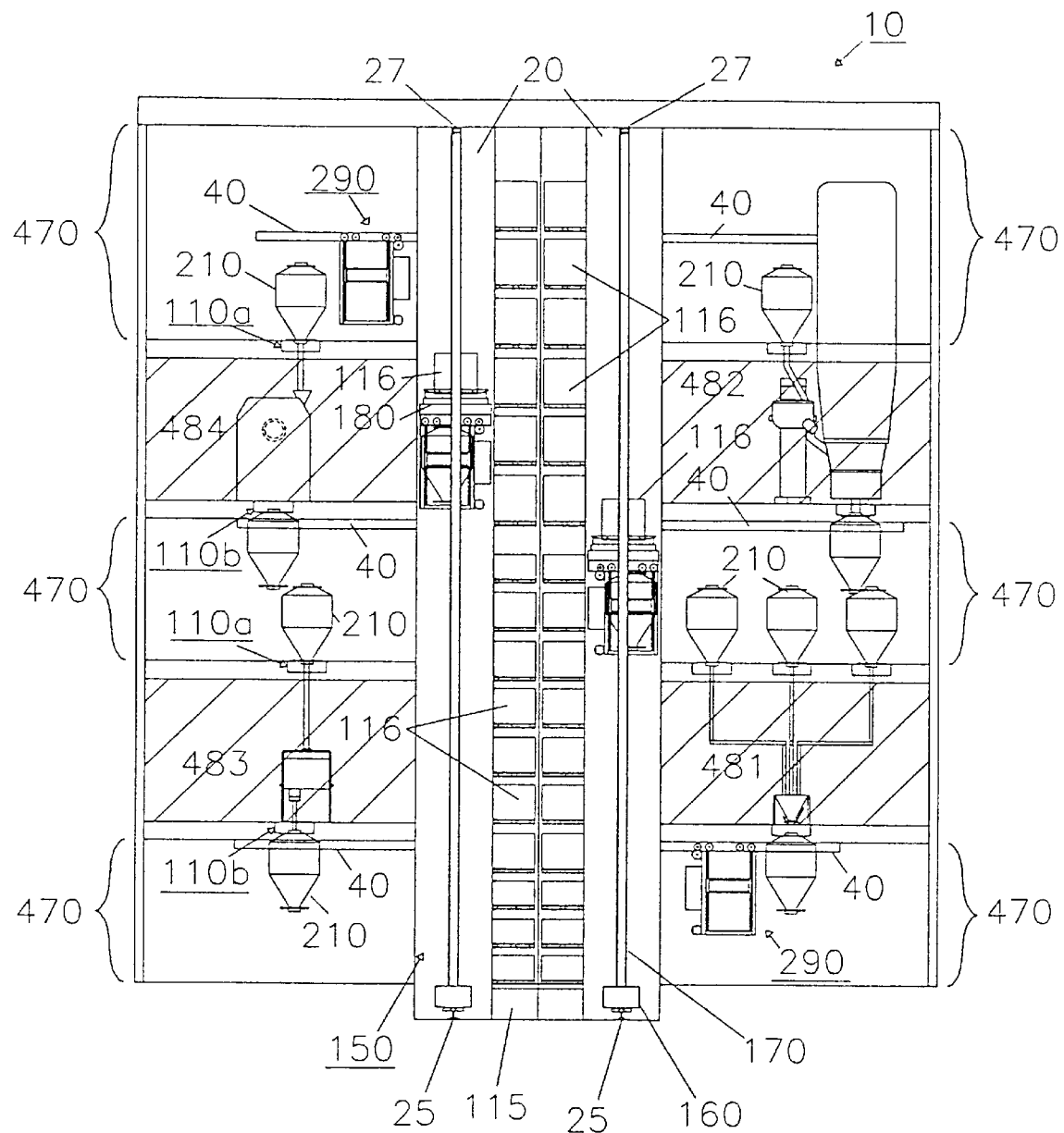
FIG. 1 is a general diagrammatic view of a section through a vertical plane of an installation according to the invention.

FIG. 1 is a general view of a section along a vertical plane of a computer-driven installation 10 for transporting containers 210 for products flowing by gravity according to the present invention. The installation 10 includes at least one main corridor 20 provided with a longitudinal rail 25 (here perpendicular to the sectional plane), upon which a lifting means 150 (generally called transtocker) is able to move. This lifting means 150 has a height which is substantially equivalent to the height of the building. It is guided at its upper part by a rail 27. It includes a base 160 able to move on the rail 25, a vertical mast 170 (or two masts, as the case may be) and a carriage 180 able to move vertically along the mast 170. The horizontal movement of the lifting means 150 and the vertical movement of the carriage 180 on the mast 170 allow the said carriage 180 to reach any position in a vertical plane.

The installation according to the invention is particularly suitable for industrial complexes including several storeys. In the example illustrated in FIG. 1, the building includes five storeys. The upper, central and lower storeys are technical storeys 470 particularly intended for transporting containers 210 and for distribution of fluids. The two storeys situated respectively between the upper storey and the central storey and between the central storey and the lower storey include various premises known as "clean" premises intended for weighing and processing the products. In FIGS. 1, 11, 17 and 18, the "clean" premises have been hatched.

This arrangement is particularly suitable for the pharmaceutical industry where products have to be processed under very strict conditions of cleanliness and indeed even of sterility, while avoiding any contamination of the atmosphere, both in the "clean" premises and in the technical storeys, by the products manufactured, and also avoiding any mutual cross-contamination of the products.

Figure 11:
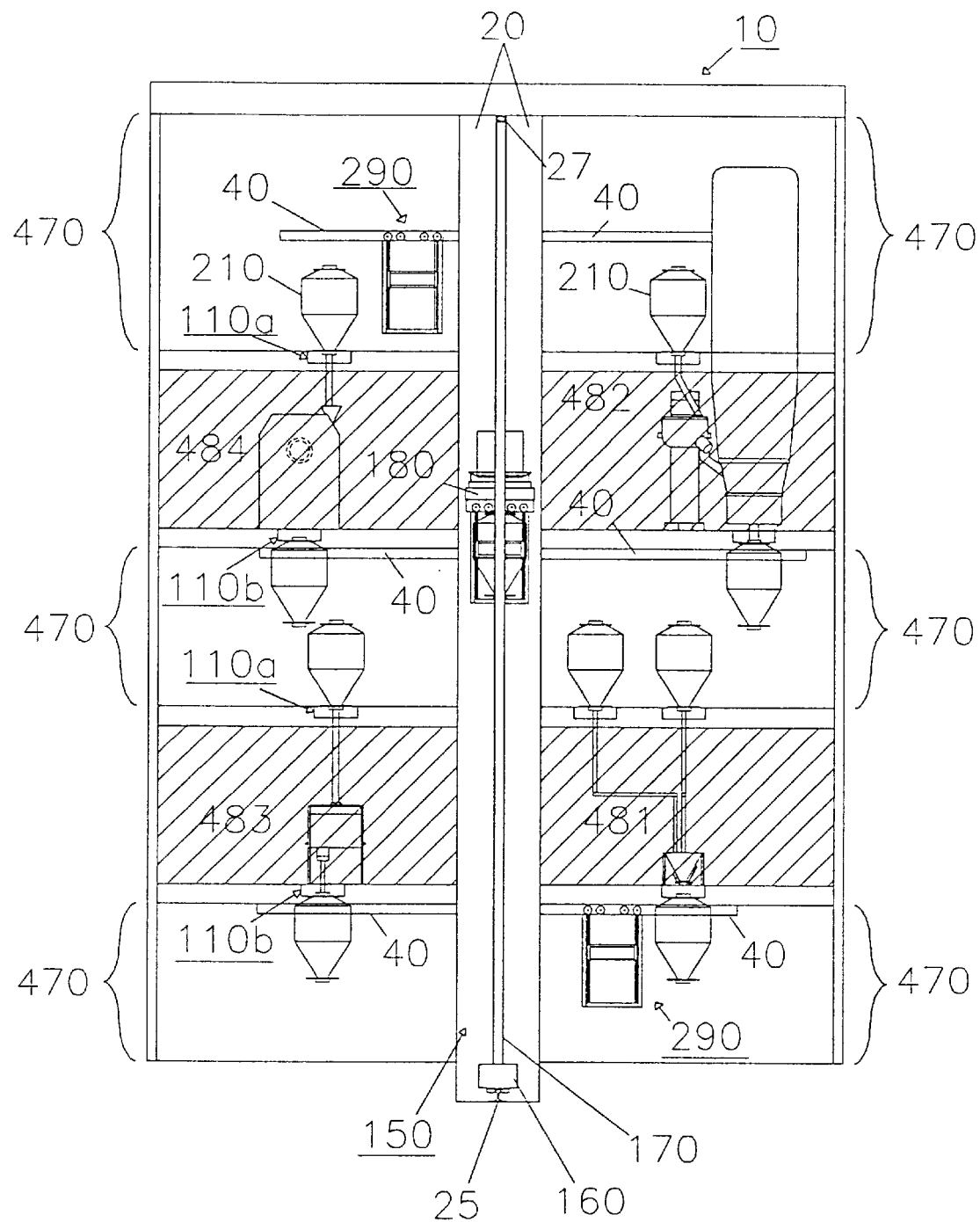
FIG. 11 is a view similar to that of FIG. 1 of a variant embodiment of an installation (this one uses a satellite unit similar to that of FIG. 10 operating between two production zones)
Figure 17:
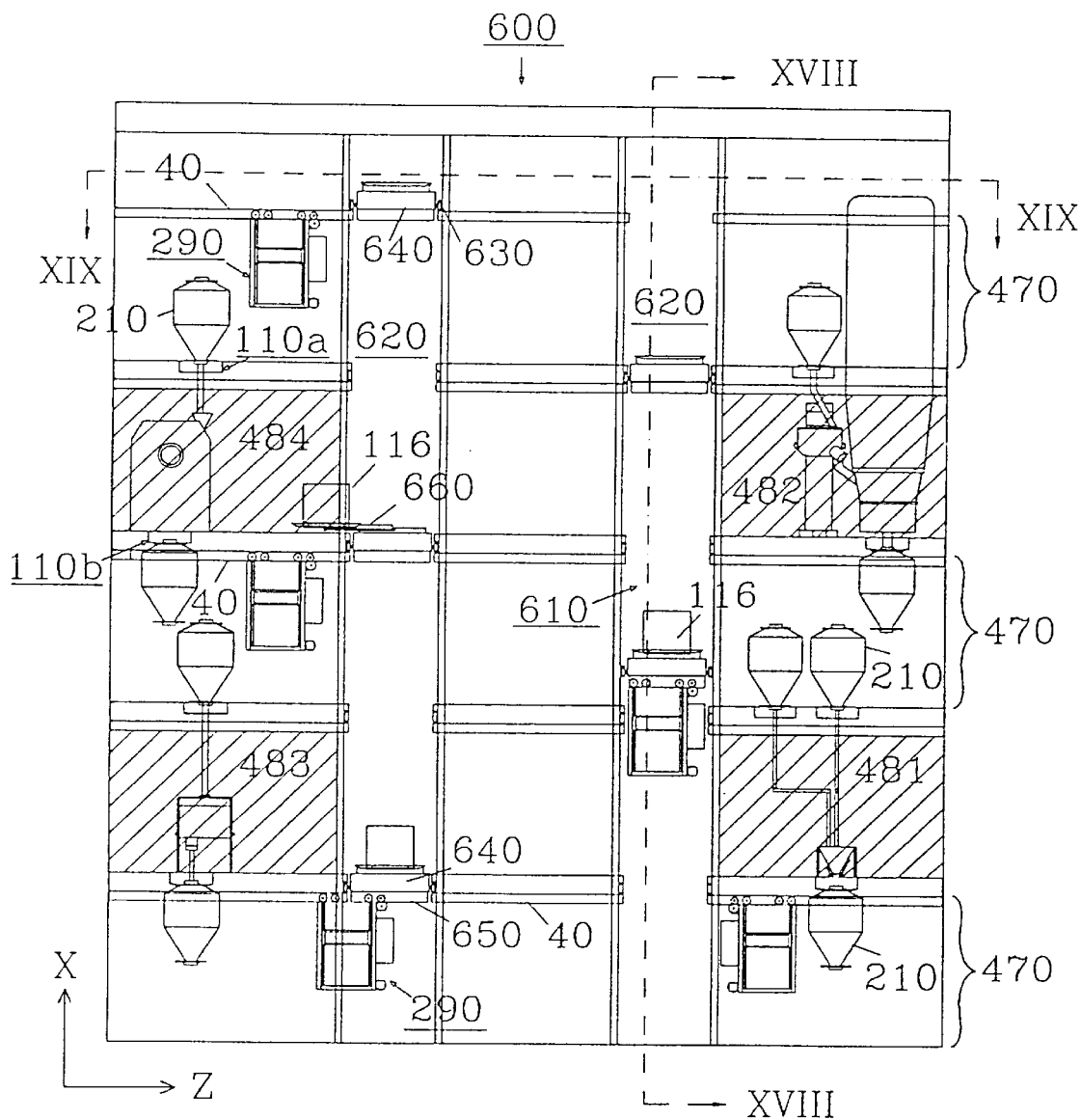
FIG. 17 is a view similar to that of FIGS. 1 and 11 of a variant embodiment of an installation according to the invention.

The processing premises (the overall reference of which is 480) are, in the case of the pharmaceutical industry, for example, a granulation room 482, a compression room 483, a coating room 484, or a weighing room 481 (cf. FIGS. 1, 11 and 17).

In the various technical storeys 470, lateral rails 40 are arranged, perpendicularly to the main corridor 20, on one side of this main corridor 20. The other side of the corridor 20 can then be occupied by a metal rack 115 for storing pallets 116 or containers 210. This arrangement makes it possible, without sacrificing safety, to have considerable storage capacity available, very close to the production site, and places the products at the disposal of the production operators in record time.

According to one variant embodiment of the installation according to the invention, illustrated in FIG. 11, it is possible, however, to provide lateral rails 40 on both sides of the main corridor 20, if the design of the factory justifies it.

In the example illustrated in FIG. 1, the rail 25 has a U-shaped path and passes on either side of a central rack 115. Technical storeys 470 and processing premises are arranged on either side of the central corridor 20.

The lateral rails 40 make it possible to route the satellite units 290 holding the containers 210 to sites where their contents can be handled or to storage posts. The sites where the contents of the containers have to be handled are provided with stations 110a, b, where the container 210 remains immobilized for a certain time.

The said stations 110a, b may be either feed stations 110a, where the contents of a container 210 are transferred into a treatment premises, or reception stations 110b, where a product coming from the processing premises is recovered into another container 210.

For constructing the technical storeys, a structure of beams which is provided with simple metal passageways (for maintenance) may suffice. This allows substantial savings to be made during the construction of the building.

Other lateral guidance means can also be provided, such as roller conveyors or chain conveyors.

Figure 2:
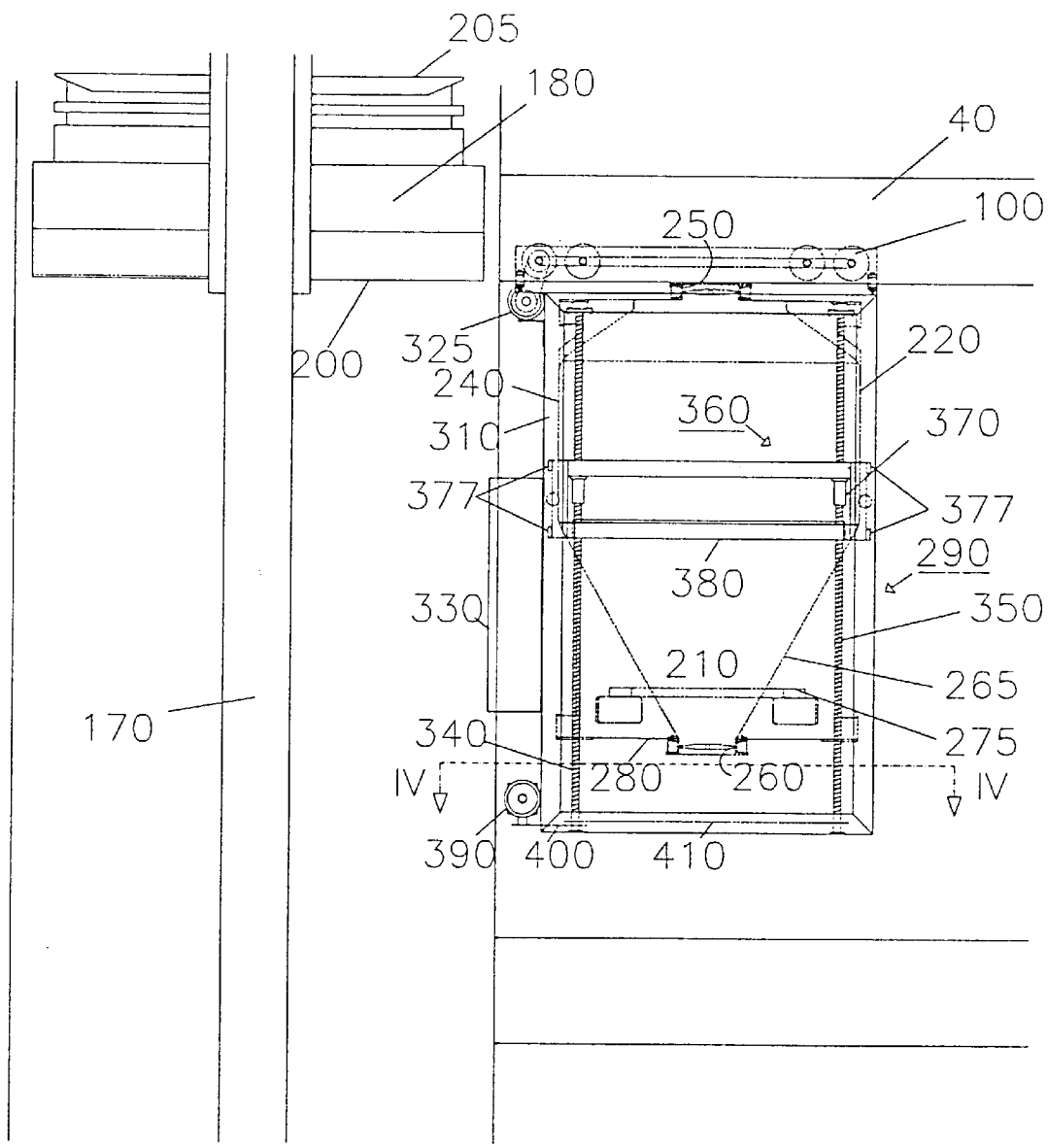
FIG. 2 is a view according to the same vertical plane of a satellite unit, carrying a container, guided by lateral rails.
Figure 3:
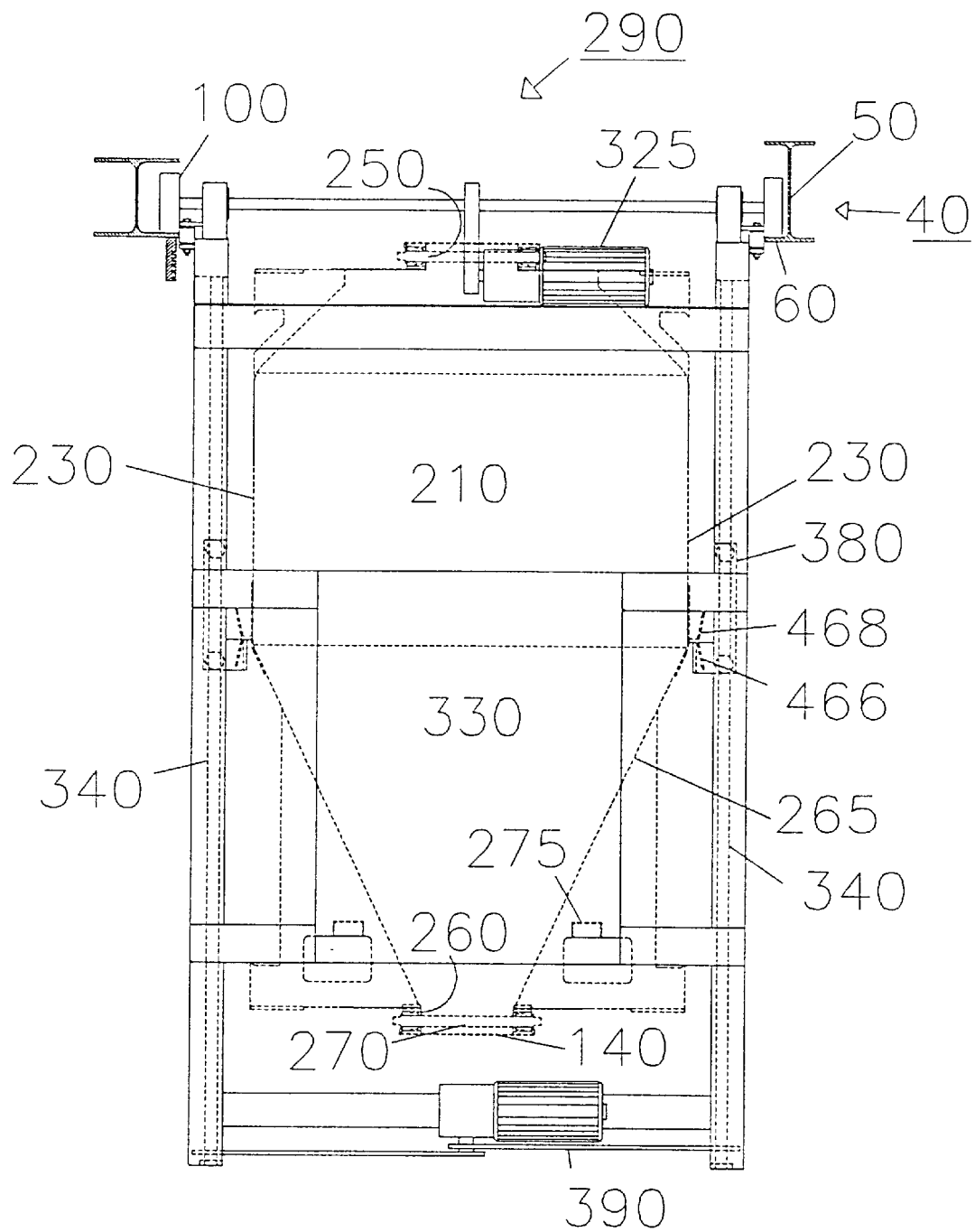
FIG. 3 is a rear view similar to that of FIG. 2.
Figure 4:
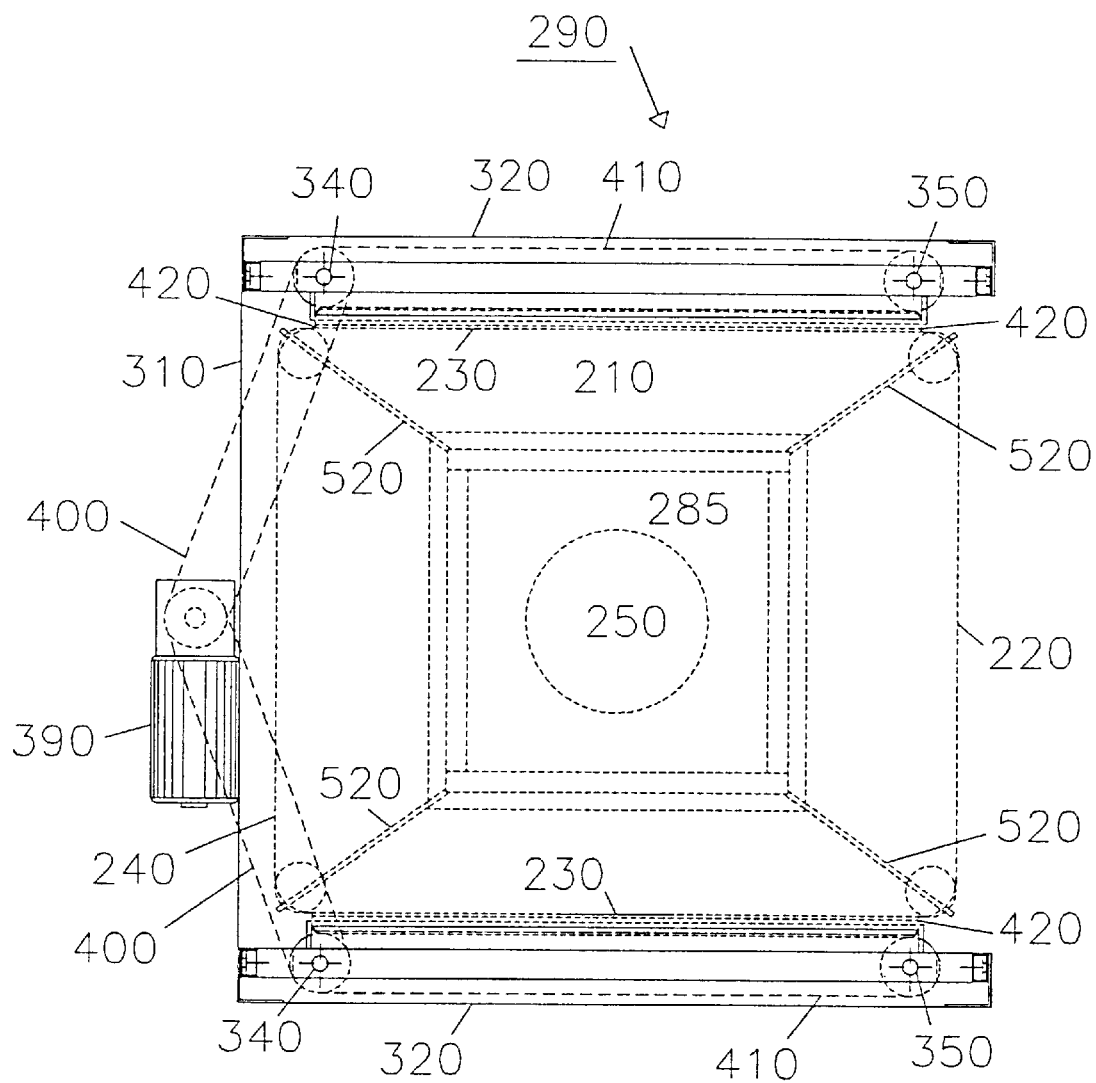
FIG. 4 is a section along the line IV—IV of FIG. 2.

FIGS. 2, 3 and 4 show a container 210 for products flowing by gravity, held by a satellite unit 290, located on a technical storey.

In general, the container 210 includes a front wall 220, two side walls 230, a rear wall 240, an upper orifice 250 turned upwards and a lower orifice 260 turned downwards, as well as a hopper 265 for discharging the product.

The satellite unit 290 includes a cage the shape of which is a parallelepiped. The upper side, the lower side and at least one lateral side of the cage are open.

According to one embodiment, the cage exhibits a C-shaped horizontal section, the opening of the C being turned towards the front wall 220 of the container 210. In this case, the cage includes three substantially rectangular walls, a rear wall 310 and two side walls 320. In order to reduce costs due to the materials used, these walls 310, 320 can be reduced to an assembly of sectional bars forming a rigid frame.

Figure 10:
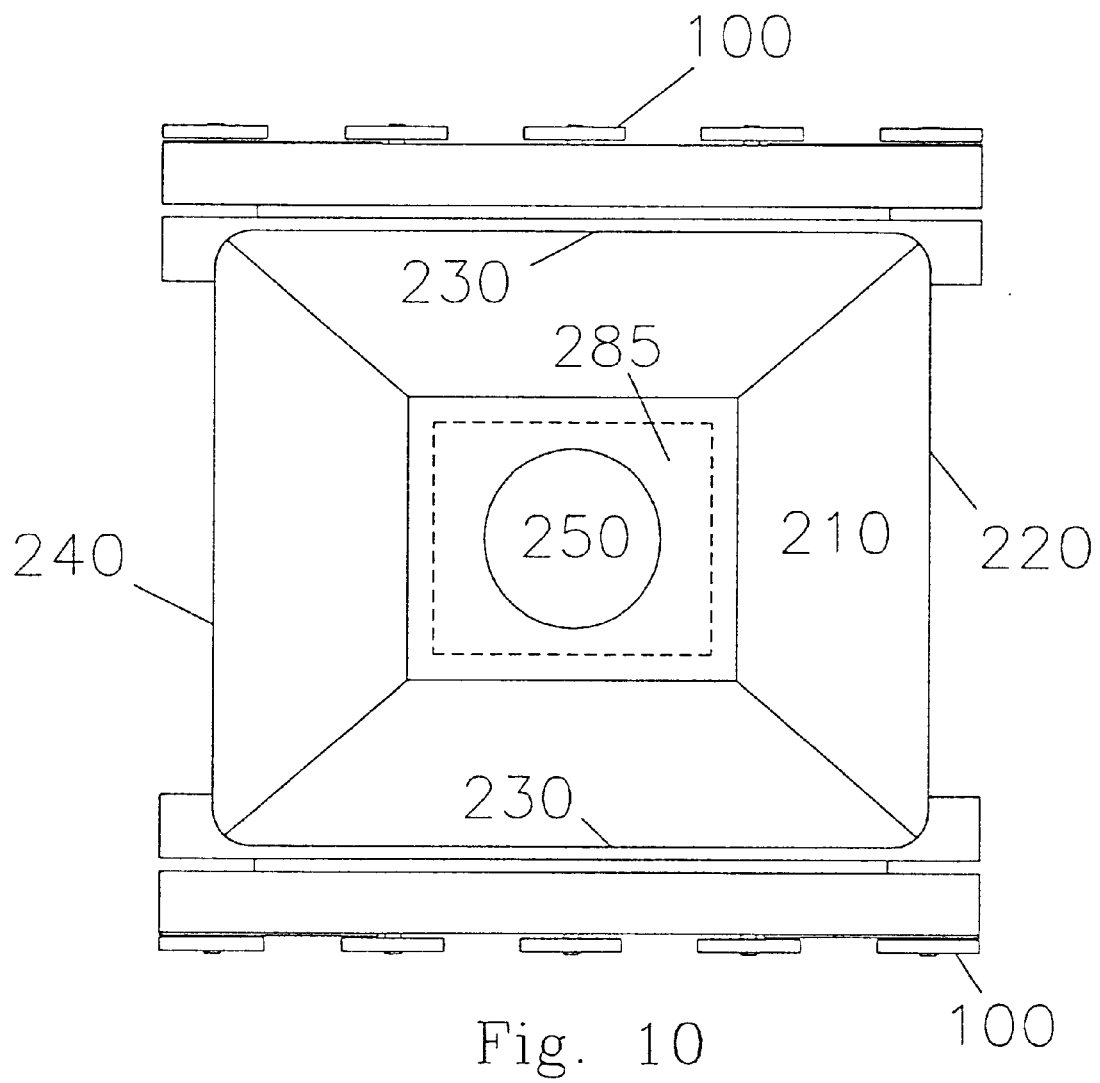
FIG. 10 is a plan view of a variant embodiment of a satellite unit transporting a container (bilateral-entry satellite unit)

In certain cases, for example when the installation includes a multi-storey structure on either side of the main corridor 20 (cf. FIG. 11), the cage can be designed in such a way that its rear wall 310 is dispensed with. In this case, the structure formed by the side walls has to be reinforced in consequence. FIG. 10 represents a satellite unit produced according to this variant. The horizontal section of the cage of the satellite unit no longer has the shape of a C, but the shape of two bars. This has the advantage that the containers 210 can enter on one side of the satellite unit and leave it on the other side, if desired.

Figure 5:
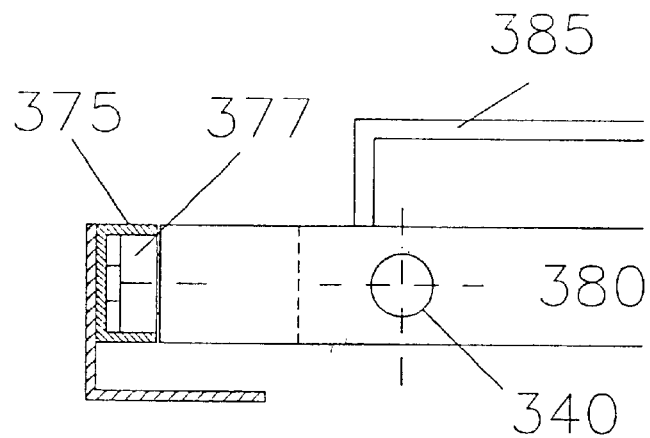
FIGS. 5 and 6 are detail views of the vertical translation means.

The satellite unit 290, represented in FIG. 2, includes a vertical translation device 360. In the embodiment described in FIGS. 4 to 6, this device 360 includes four worm screws 340, 350 extending vertically over the whole height of the satellite unit 290. These four worm screws 340, 350 are placed within the cage, close to its four corners (FIG. 4). The two worm screws 340 situated close to the rear wall 310 of the satellite unit 290 are linked by drive belts 400 to a motor 390 associated with a reducing gear (it is then possible to speak of a motor/reducing gear 390). Each of the screws 340 is also linked by a toothed drive belt 410 to the worm screw 350 which is placed close to the free edge of the wall 320 opposite the edge adjoining the wall 310. In this way, the four screws 340, 350 turn at the same speed when the motor/reducing gear 390 is put into action.

Figure 6:
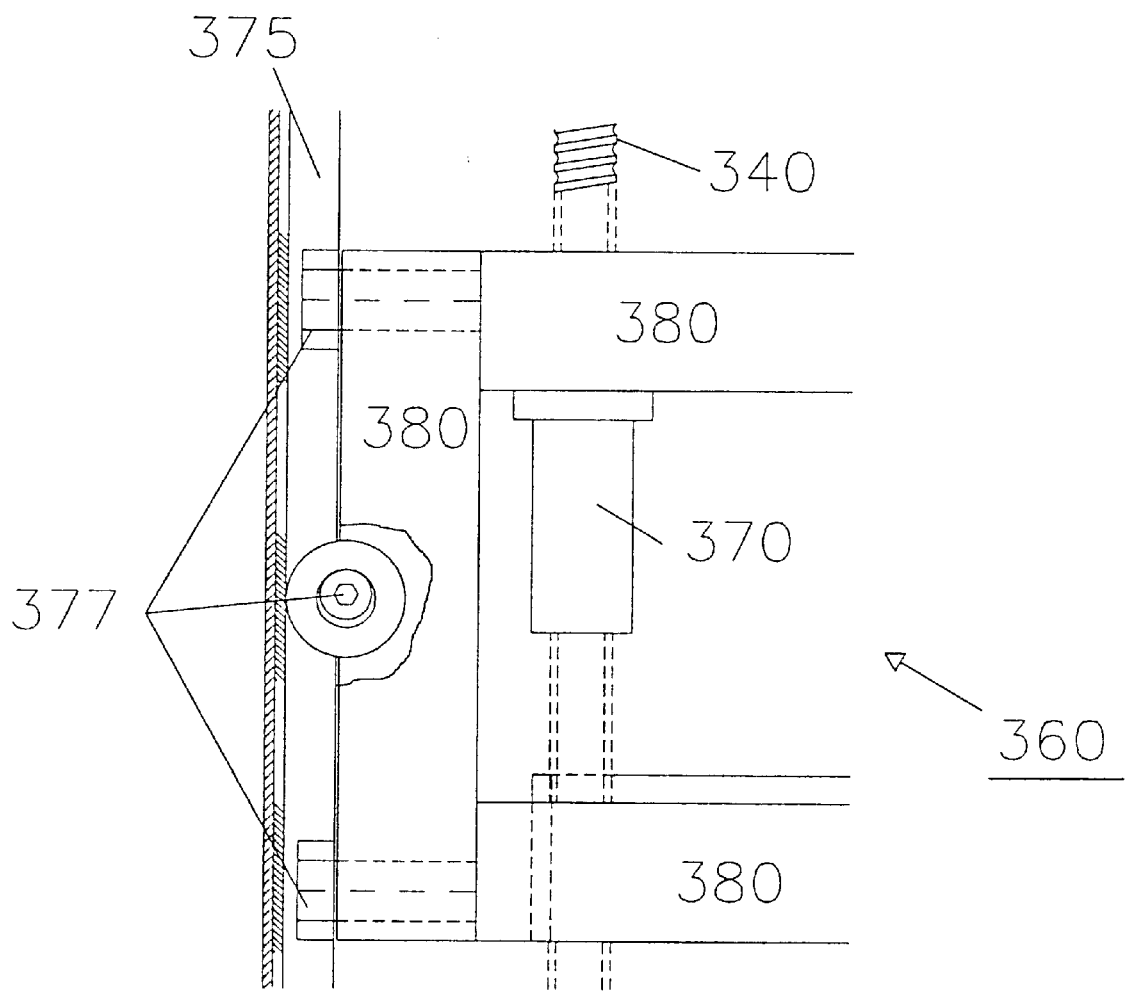

FIG. 6 shows, in a more detailed way, that the vertical translation device 360 includes a chassis 380 in two parts which are each arranged parallel to a side wall 320 of the satellite unit 290 and able to move vertically along the screws 340, 350 by means of four threaded sleeves 370.

In order to avoid twisting the vertical translation device 360, the chassis 380 is guided by vertical slideways 375 in the corners of the satellite unit 290. Ball bearings 377 arranged at the four corners of each part of the chassis 380 guide its movement in the slideways 375.

When the four worm screws 340, 350 are set into rotation, the two parts of the chassis 380 are moved upwards or downwards, according to the direction of rotation of the screws 340, 350. The screws 340, 350 must, obviously, turn at the same speed so that both parts of the chassis 380 move uniformly.

This vertical translation device 360 makes it possible to raise or lower a container 210 by a height of about 3 feet (or more if the arrangement of the installation justifies it), so as to bring this container 210 close either to a reception station 110b or to a feed station 110a.

Other vertical translation devices are conceivable, such as devices including fewer than four screws or devices operating by means of cables, chains, hydraulic or pneumatic jacks, or rack-and-pinion gears.

Figure 7:
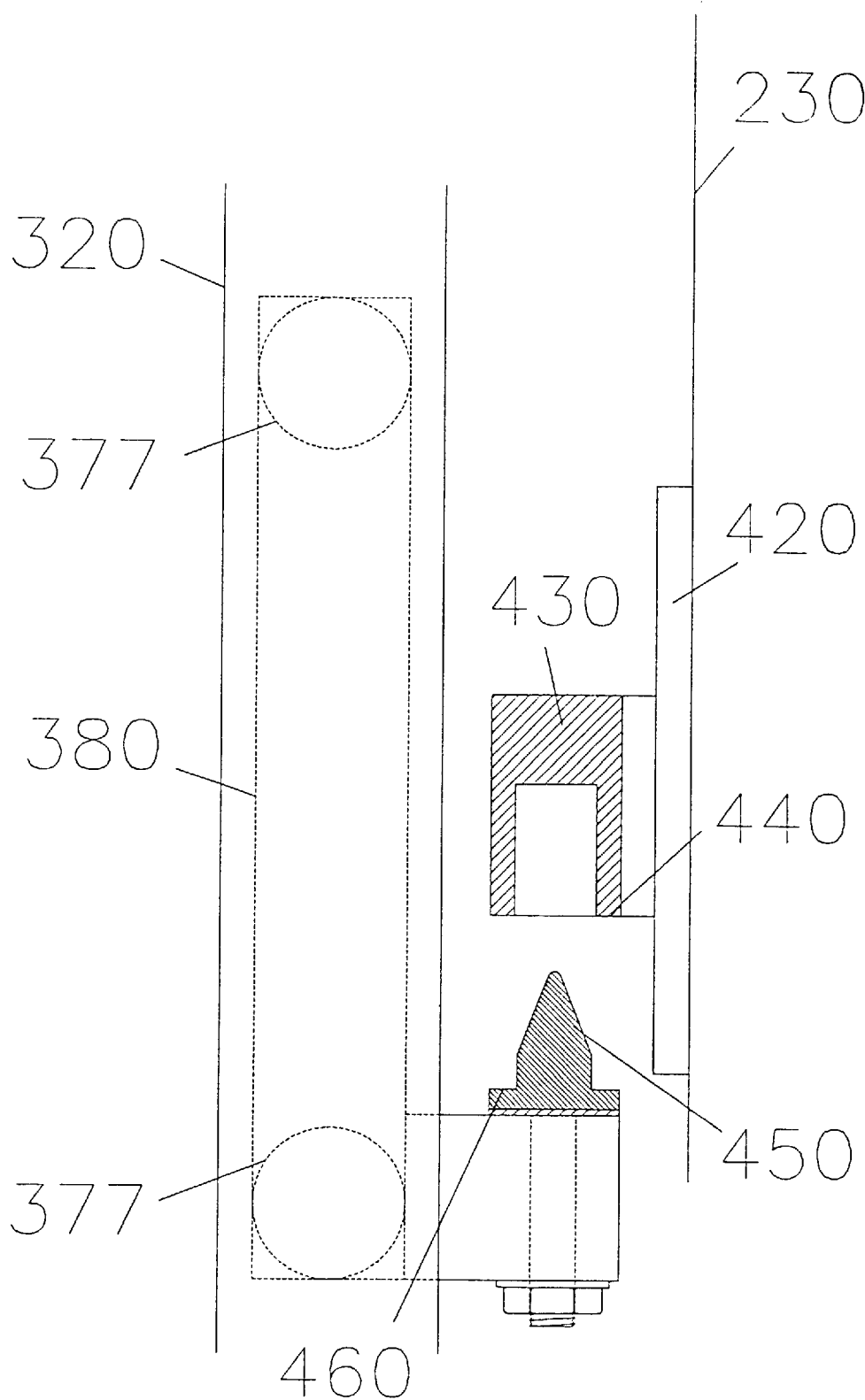
FIG. 7 is a detail view of a means of gripping a container.

Positioning studs 450, (cf. FIG. 7) directed upwards, are fixed to each part of the chassis 380. A bearing surface 460 extends horizontally all around each stud 450.

The container 210 includes four reinforcing plates 420 fixed to the outside of its two side walls 230 at the sites corresponding to the location of the studs 450. On each of these reinforcing plates 420 a sheath 430 is fixed, closed or otherwise at its upper part, able to engage on the corresponding stud 450 of the chassis 380. A clearance of about 0.04 inch is formed between the outer edge of the stud 450 and the inner edge of the sheath 430 when it is engaged on the stud 450. The lower edge 440 of the sheath 430 is able to rest on the bearing surface 460 arranged around each stud 450.

Other positioning systems are also possible, such as, for example, that illustrated in FIGS. 8 and 9, which will be described later.

Instead of being actuated by belts 400, 410, the four screws 340, 350 can be actuated in a similar way by chains, by a worm screw gearing or by transmission by angular gearings. It is within the scope of the person skilled in the art to replace these mechanical elements by any other appropriate device.

In the embodiment of the invention illustrated in FIGS. 1, 2, 3, 11 and 12, the lateral rails 40 are fixed to the upper part of the technical storeys. The satellite unit 290 then includes, at its upper part, wheels 100 able to engage in the double rails 40.

Figure 13:
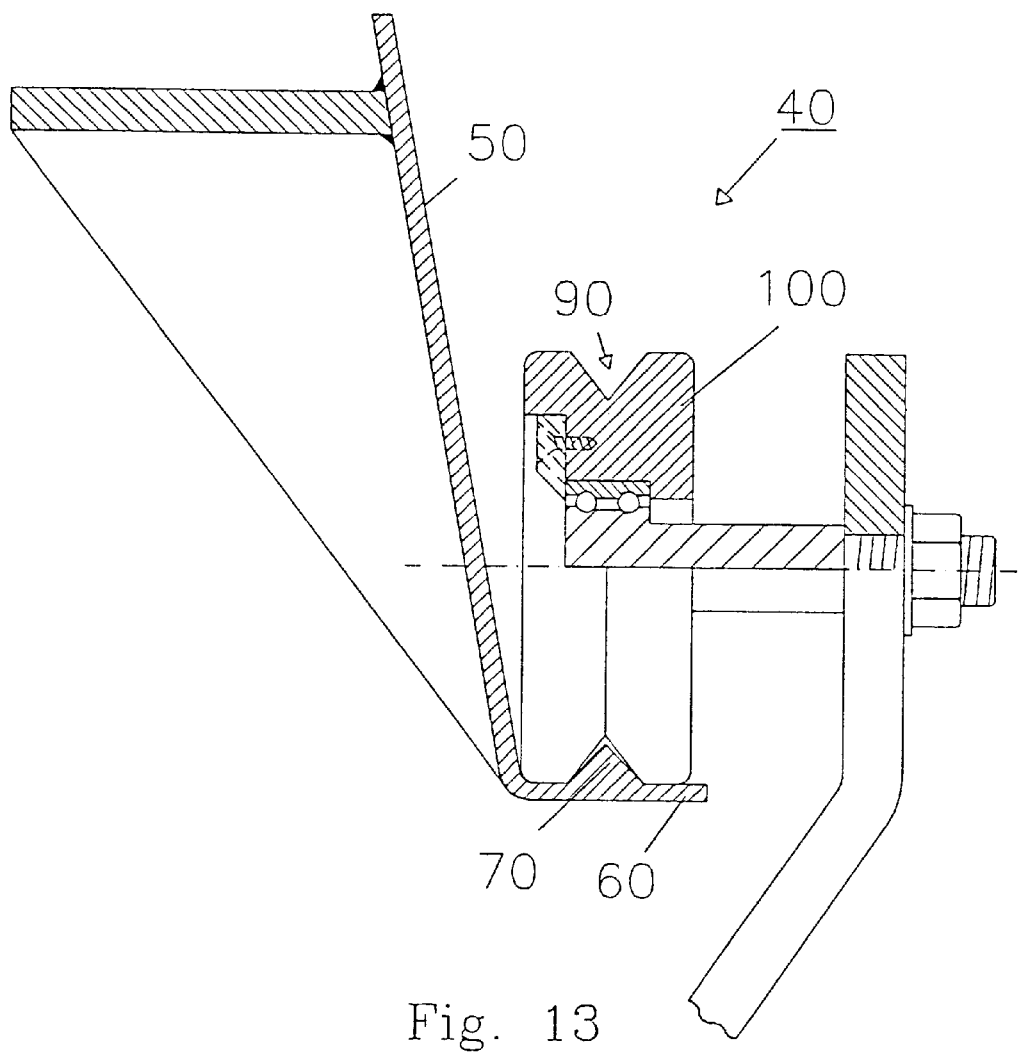
FIG. 13 is a detail view of a lateral rail and of a wheel of the satellite unit.

According to one embodiment illustrated in FIG. 13, the vertical section of the double rails 40 of the technical storeys 470 have the shape of a L, in which the angle between the branch 50 turned upwards and the branch 60 placed horizontally is obtuse. This shape allows the wheels 100 to be guided to the correct position.

A rib 70 is formed on the upper branch 60 of the rail 40 and a groove 90 of corresponding shape is provided on the periphery of the wheels 100 in order to hold them correctly on the rails 40.

According to the particular embodiment of the invention illustrated in FIGS. 2 and 3, the carriage 180 of the transtocker 150 includes double rails 200, fixed to its lower part, from which the satellite unit can be suspended by means of its wheels 100.

A pallet 116 can also be transported on the carriage 180 (FIG. 1).

When a container 210, picked up by the satellite unit 290, has to be taken by the carriage 180 of the lifting means 150 to a previously indicated technical storey 470, the carriage 180 is led extremely precisely to a distance of about 0.8 inch from the lateral rails 40, so that the rails 200 of the carriage 180 are situated in the extension of the rails 40 of the technical storey 470. In that way, the wheels 100 of the satellite unit 290 can pass from the double rails 200 of the carriage 180 to the double rails 40. From then on, these wheels 100 are actuated by an actuation system which is located on the satellite unit 290 itself. This actuation system is here an electric motor 325, combined with a speed variator and controlled by a unit 330 consisting of a programmable automatic unit generally called a PLC (Programmable Logic Controller), or by other conventional electrical circuits, which the satellite unit 290 carries on board.

The satellite unit 290 is electrically powered, either from an on-board battery, or from wipers sliding along a power supply rail.

Figure 12:
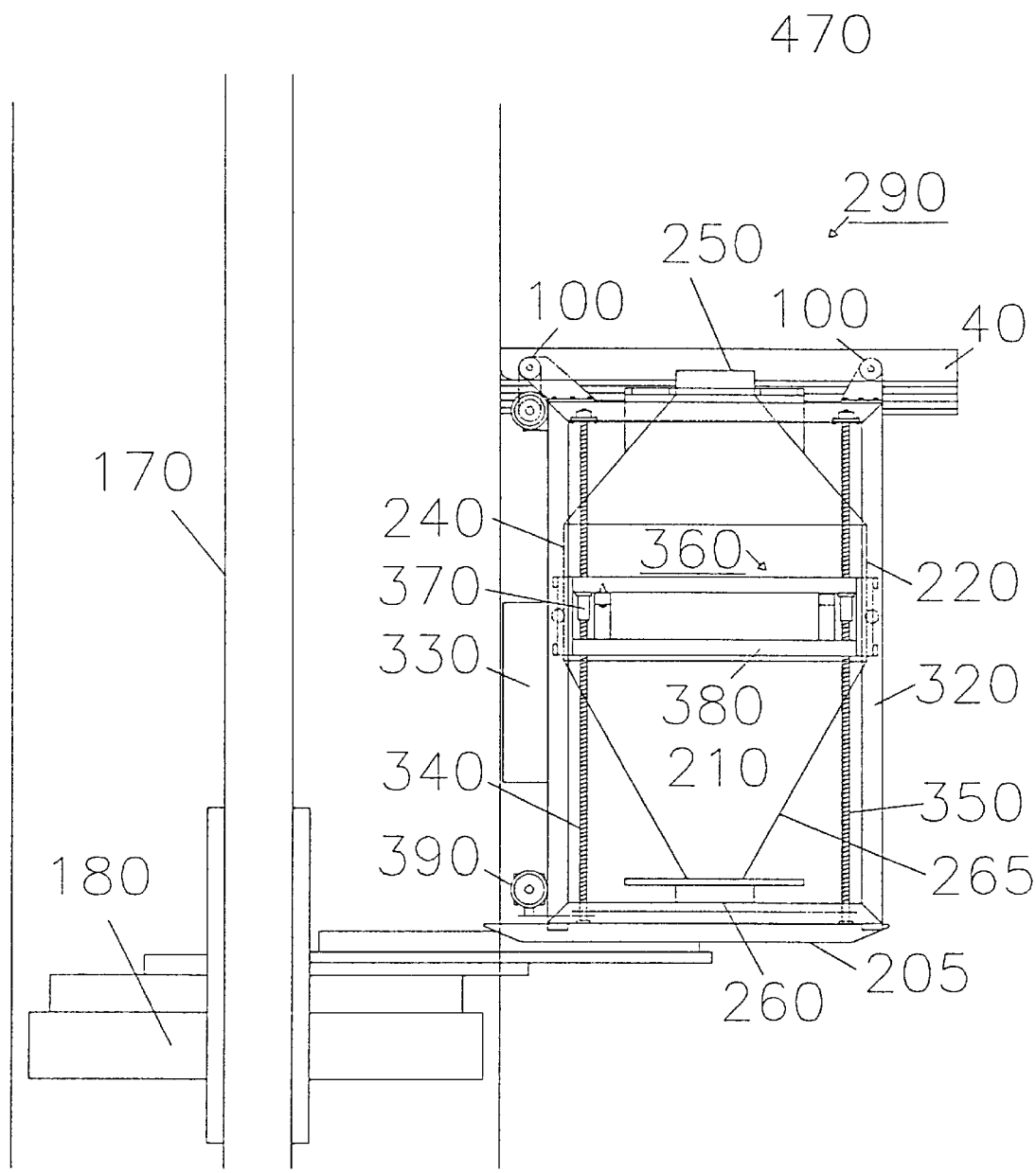
FIG. 12 is a view similar to that of FIG. 2 of a satellite unit carrying a container and transferred onto the lateral guidance means using forks mounted on the transtocker.

FIG. 12 shows another embodiment of the invention in which the carriage 180 includes telescopic forks 205 on which the satellite unit 290 can rest. The satellite unit 290, carrying the container 210, is brought by the forks 205 of the carriage 180 to a technical storey 470. The wheels 100 which are located at the upper part of the satellite unit 290 are placed on the rails 40, after which the process progresses in the same way as explained above.

The satellite unit 290 carrying a container 210 moves, suspended on the rails 40, until it arrives at an appropriate station 110a or 110b. Once it has arrived just above a feed station 110a or below a reception station 110b, the four worm screws 340, 350 are actuated. The control unit 330, mounted on board the satellite unit 290, is programmed to detect whether the container 210 is taken to a feed station 110a, or to a reception station 110b. It gives instructions, as appropriate, to have the screws 340, 350 turned to the right or to the left, so as to lower or raise the vertical translation device 360, and hence the container 210.

Figure 14:
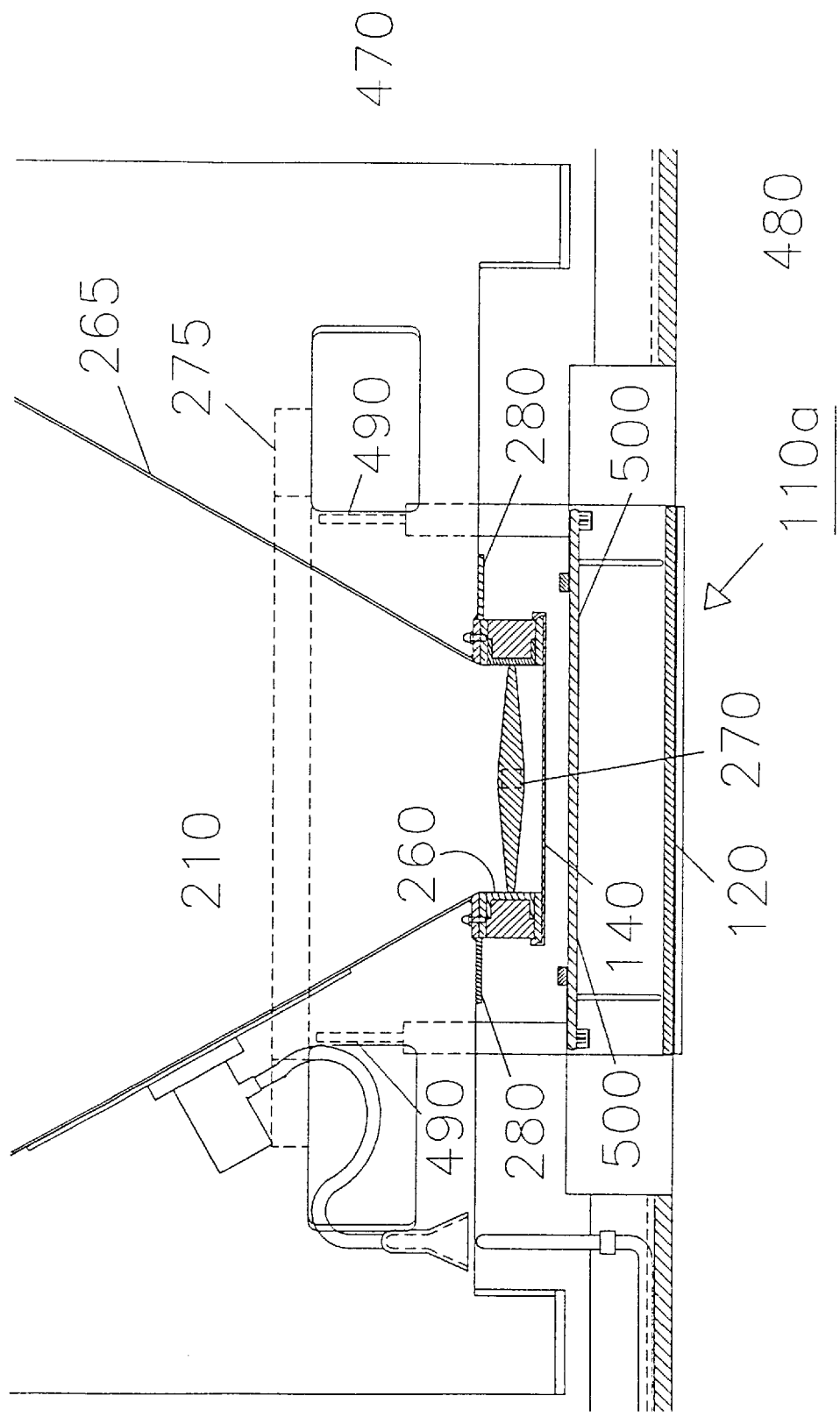
FIG. 14 is a view of the lower part of a container situated above a feed station.
Figure 15:
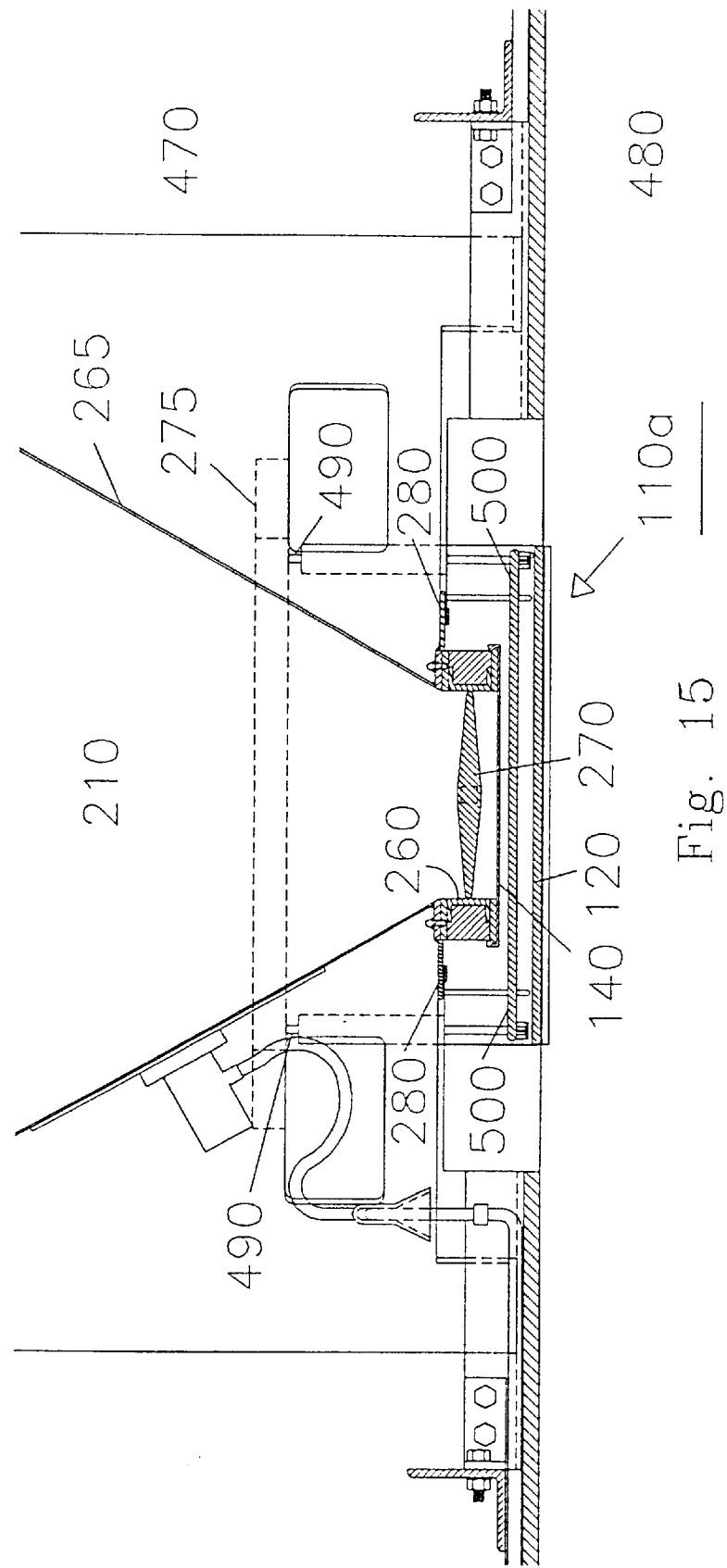
FIG. 15 is a view of the lower part of a container connected to a feed station.

FIG. 14 shows a container 210 situated just above a closed feed station 110a, and FIG. 15 shows the container coupled, in a completely leaktight way, to a feed station 110a.

The ceiling of the processing premises situated under the station 110a possesses a hatch 120, forming part of the feed station 110a. It can be opened manually by an operator present in the processing premises.

The container 210, closed at its lower part by a valve 270 and by a cover 140 is positioned by known indexing means (not represented) just above the station 110a. These means may, for example, be optical, infrared, magnetic, etc. detectors.

Before the container 210 arrives at the feed station 110a, the latter is closed by a cover 500 held in its upper position by a system of springs. The container 210, as soon as it is correctly positioned, is lowered by the vertical translation device 360. The means 275 for opening this container then progressively presses on the rods 490 of the system of springs (see FIGS. 14 and 15). These rods 490 go down, and thus cause the cover 500, which was closing the feed station 110a, to go down.

The lower orifice 260 of the container 210 can be inserted into the station 110a, and the container 210 can continue to descend until a collar 280, surrounding the lower part of the container 210, closes off the opening of the station 110a.

In order as far as possible to reduce any contamination of the atmosphere and of the product, filtered air or an inert gas is blown into the station 110a so as to extract any dust or impurity therefrom.

As the hatch 120 and the cover 500 of the station are transparent, an operator located in the processing premises 480 close to the hatch 120 can verify that the container 210 led in actually is the one which is required, given that information relating to the contents of the container 210 is written on the cover 140 of the container 210, or on the collar 280.

Whenever the, station 110a is considered to be potentially contaminated, the hatch 120 cannot be opened. Automated locking is provided. After passing filtered air or inert gas through, the automated locking is unlocked and the hatch 120 can be opened manually. The cover 500 of the station is easy to remove manually, as is the cover 140 of the container 210. The connection between the lower orifice 260 of the container 210 and a conduit (not represented) leading the product to its processing site can be made. After opening the valve 270, the product can flow out to its processing site.

After the product is transferred, the container 210 can be withdrawn and the station 110a can be closed off by carrying out a sequence of operations which is the reverse of those described above. The cover 500 is replaced and, with the rods 490 being connected to springs 485, this cover 500 automatically resumes its initial position when the opening means 275 no longer applies pressure on the rods 490.

Figure 16:
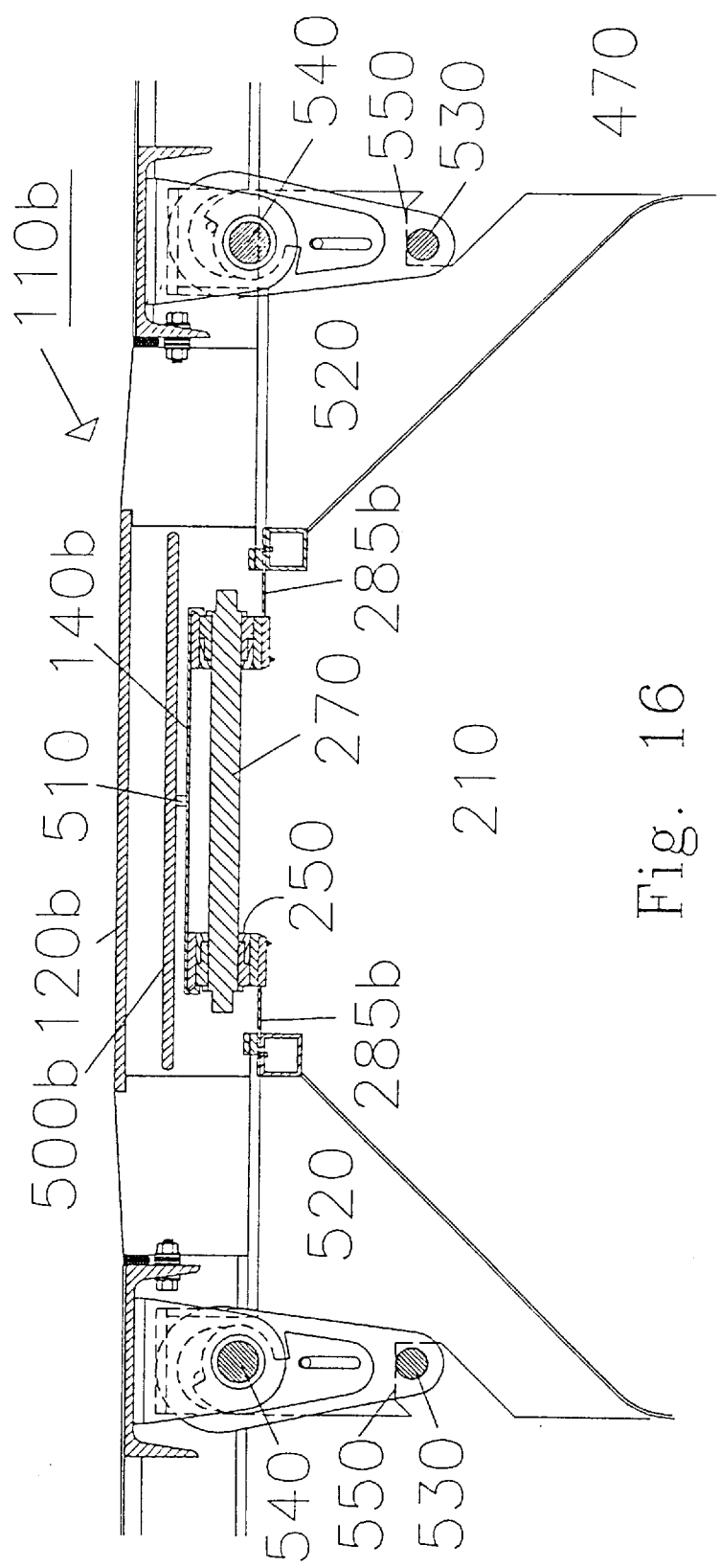
FIG. 16 is a view of the upper part of a container connected to a reception station.

A similar principle applies for connecting the container 210 to a product reception station 110b, under the processing premises 480 (FIG. 16). This time, the processing premises 480 has a hatch 120b in the floor, forming part of the reception station 110b which is able to accommodate the upper orifice 250 of the container 210. The container 210 is raised by the vertical translation device 360. The cover 500b of the station is held in its lower position by gravity. At least three cylindrical feet 510 are fixed to the upper cover 140b of the container 210. They create a space between the cover 140b of the container 210 and the cover 500b of the station when the container 210 is lifted by the vertical translation device 360.

The container 210, fitted with four fins 520 (see FIG. 16), is raised by the vertical translation device 360 until it is a few millimeters under the reception station 110b. The fins are vertical plates placed radially at the upper part of the container 210. They have a notch 550 in which a lifting bar 530 engages. This lifting bar 530 raises the container 210 by rotating a cam integral with a horizontal spindle 540, until the upper collar 285b of the container 210 closes the opening of the reception station 110b. The container 210 is held in its upper position by virtue of its fins 520 and the lifting bar 530. This system of locking the container 210 is actuated by a mechanical system.

Here again, filtered air or an inert gas is blown into the station 110b so as to withdraw any dust or impurity therefrom.

With the hatch 120b and the cover 500b also being transparent, an operator located in the processing premises 480 can verify whether the container 210 which has been led in is the correct one, and he can take similar actions to connect the container 210 and a duct (not represented), and to make the product flow into the container 210. In order to remove the container 210, a set of operations which is the inverse of those described above has to be carried out.

The bars 530 descend so as to deposit the container 210 on the chassis 380 of the vertical translation system 360. That being done, the bars 530 move apart to allow the container 210 to descend.

Many embodiment variations could be conceived by the person skilled in the art.

Various means of supporting the container on the satellite unit 290 are conceivable. FIGS. 8 and 9 show a variant embodiment of these support means. On each reinforcement plate 420 of the container is fixed a sectional bar 465 extending horizontally along the side walls of the container 210, to which is fixed a guidance plate 466 also extending horizontally, the free longitudinal edge of which is turned downwards, extending slightly away from the container 210. The sectional bar 265 and the guidance plate 466 thus form a horizontal gutter 461 widening out downwards.

The vertical translation device 360 then includes a gripping element 385 of corresponding shape, able to engage in the gutter 467 of the container 210. This gripping element 385 consists of a horizontal sectional bar of rectangular cross section, the folded ends of which are fixed to the chassis 380, and the two longitudinal edges of which are oriented upwards in one case and downwards in the other. As FIGS. 8 and 9 show, this gripping element 385 consists of a horizontal sectional bar.

The container may further include a second similar guidance plate 468 fixed to the upper part of the sectional bar 465, the free longitudinal edge of which is turned upwards. This second guidance plate 468 forms a second gutter 469 widening out upwards.

This second gutter 469 is able to accommodate the same element for gripping the satellite unit 290 described above, when the container is turned over by 180°.

Indeed it may be advantageous to use containers having only a single orifice. This orifice will be turned downwards when the container has to discharge its contents via a feed station 110a. When the container has to receive a product via a reception station 110b, the container will be turned over by 180° so that its single orifice is turned upwards. Opposite the orifice, the container may include an access allowing easy cleaning thereof.

Such a reversible container has the advantage that there is only one single face at any station, and that the labelling of the identification system indicating the contents of the container, which appears on the collar, can be read from the two stations.

Figure 18:
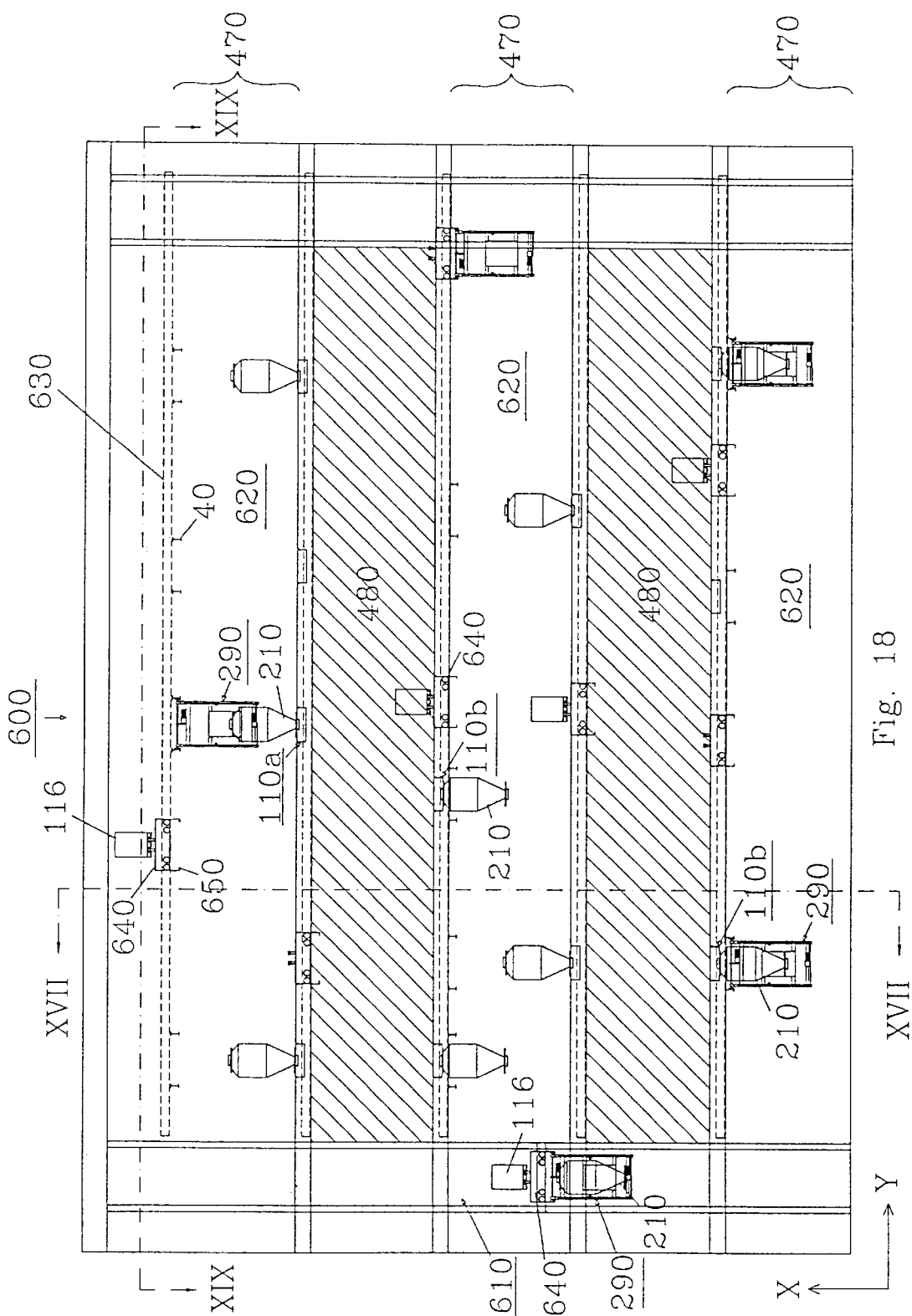
FIG. 18 is a general diagrammatic view of a vertical, longitudinal section, along the line XVIII—XVIII of FIG. 17.
Figure 19:
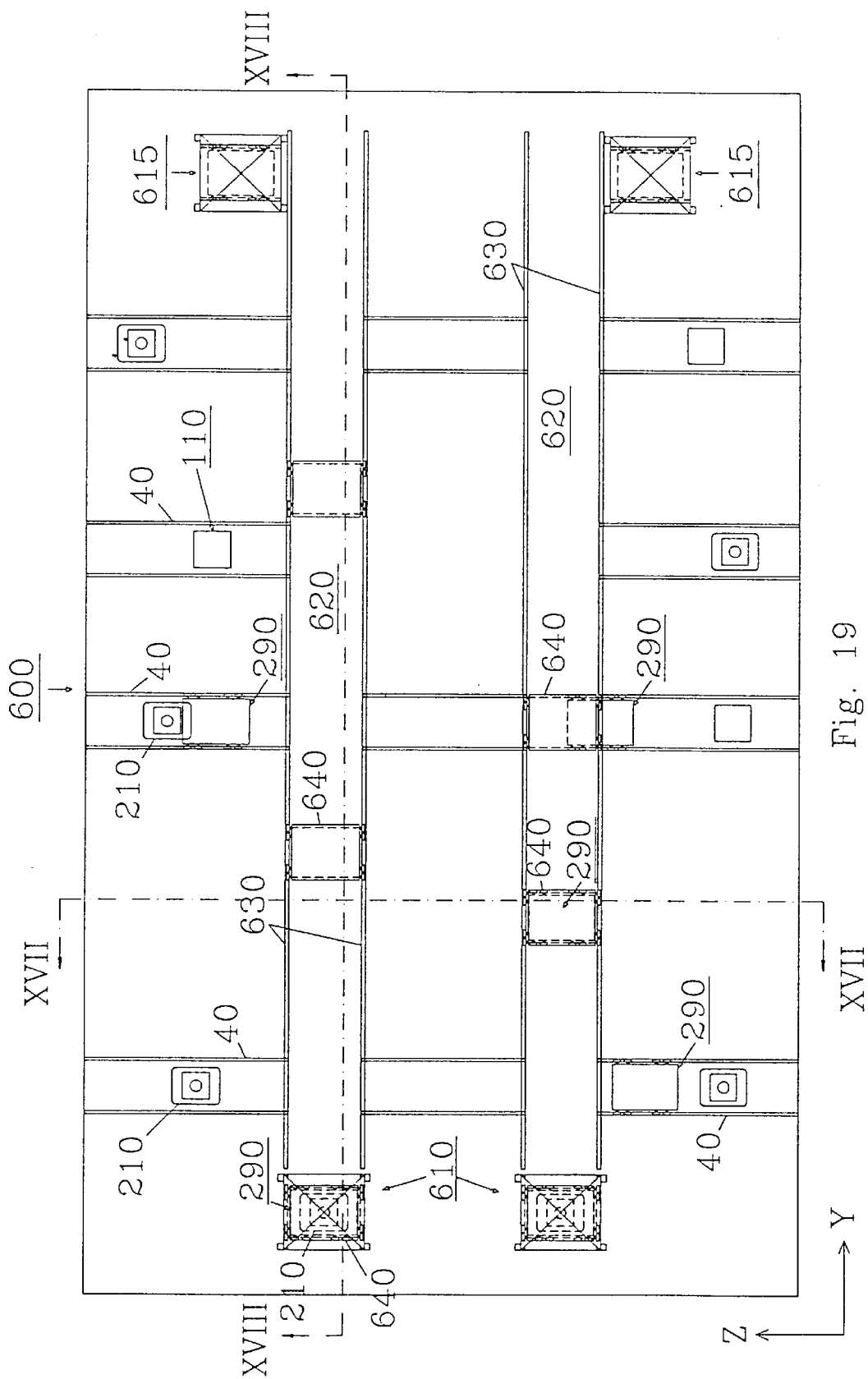
FIG. 19 is a horizontal section along the line XIX—XIX of FIGS. 17 and 18.

FIGS. 17, 18, 19 present a variant embodiment of the invention which, according to the configuration of the factory, may prove to be particularly advantageous.

In this variant, the installation 600 no longer includes a transtocker 150 moving along a runway 25, but includes one or more fixed goods lifts 610, 615, able to transport a satellite unit 290 and includes corridors 620, at each storey. These corridors 620 are equipped with rolling means 630 on which a trolley 640 can move.

Double rails 40 arranged perpendicularly to these corridors 620 allow the satellite unit 290 to be routed to a transfer station 110.

The trolley 640 can be equipped with two sections of rails 650 making it possible to transport the satellite unit 290 by means of its wheels 100.

If desired, the carriage 640 may also, in an ancillary way, transport pallets 116, using forks 660 (FIG. 17) or roller tables situated at the upper part of the trolley 640. The trolley 640 can carry out this transport, either simultaneously or independently of the transporting of the containers 210.

The satellite unit 290 is thus able, without resorting to a transtocker, to move in the three orthogonal directions X, Y, Z, that is to say reach any point in the building and take any container 210 thereto or therefrom.

The satellite unit 290 may thus, at will, deposit containers 210 on feed stations 110a, or hook up containers 210 at reception stations 110b, using its vertical translation device 360 (FIGS. 17, 18). It can move along the rails 40, in a direction extending along the Z axis (FIGS. 18, 19), latch onto a trolley 640, on its segments of rails 650, so as to carry out a movement along the Y axis, and be transported, vertically, by the goods lift along the X axis.

Several possible embodiments of the installation are combined in FIG. 19. At the left-hand part of FIG. 19, the goods lifts 610 are situated in line with the extension of the respective corridors 620. The trolley 640, transporting a satellite unit 290 and a container 210 can, with its load, make use of the goods lift 610.

The right-hand part of FIG. 19 illustrates the embodiment in which the goods lifts 615 are not situated in line with the corridors 620. In this case, the trolley 640 can lead the satellite unit 290 in front of a goods lift 615 and, while the satellite unit 290 uses the goods lift 615 alone, the trolley 640 remains on its runway 630. It can, from then on, without waiting any longer, carry out a further task which is assigned to it by the management system.

According to another variant embodiment of the is invention (not illustrated), the satellite unit 290 includes two sets of wheels allowing it to move along the two different horizontal axes (Y, Z). In this case, the trolley is no longer necessary, the satellite unit 290 being capable of moving, by itself, along the horizontal corridors 620, (Y axis) and along the rails 40 (Z axis).

The automatic management system associated with the device according to the invention makes it possible to work under multiple reinforced safety conditions. Not only does the layout of the installation in itself make it possible to avoid cross-contamination between the "clean" premises and the technical premises, but, furthermore, detection systems associated with the satellite units allow an unfailing check (for example, by optical reading) of the type of product present in a container, of the quantity transported (by incorporating, in the satellite, a device for weighing by strain gauge), make it possible to identify the station, to verify whether this identification corresponds to the type of process in progress, etc.

Moreover, as the position of each satellite unit is known and can be verified at any instant, the management system can generate the instructions relating to the most appropriate itinerary and even divert the satellite units to other itineraries in the event of minor incidents, without interruption of the production process.

If the precaution has been taken of providing a sufficiently powerful management system, it is, moreover, perfectly possible, depending on the imperatives of production, to incorporate an increasing number of satellite units in the installation, without anything else but minor adjustments.

Compared to horizontal factories, the subject of the invention exhibits numerous advantages; in particular, it takes up less ground, gravity can be used as a transport system, and shorter links are required (air conditioning ducts, fluid distribution, electrical lines, corridors for personnel, etc.).

Compared to pharmaceutical industrial complexes, arranged in several storeys, the subject of the invention has the advantage that the costs of construction are reduced compared to the preceding installations, because the weight of the AGV (up to 5 tonnes when laden) no longer has to be supported by every point of the building. The weight of the container is distributed over the whole length of a rail. The floor no longer has to feature any particular finish. The system is very flexible and adapts with no problem to extensions or an acceleration of the production system entailing an increase in the traffic.

Furthermore, it is particularly advantageous to use the transfer device with the leaktight transfer stations as described in U.S. Pat. No. 5,490,546.

What is claimed is:

1. An automated installation for transporting containers for products flowing by gravity, which is integrated into a multi-storey production factory including, on the one hand, premises for processing the products and, on the other hand, technical areas, wherein the said installation includes:

containers provided with at least one orifice able to be closed, stations for contamination-free transfer of the products flowing by gravity, from a container to a processing premises (feed station) and/or from a processing premises to a container (reception station), at least one satellite unit including a cage open at its lower and upper parts, and at least at one of its lateral sides, the said satellite unit being able to carry a container and including a vertical translation device to raise and lower the said container, in such a way as to allow the said container to be coupled to the said stations, the said satellite unit being able to be moved along at least one horizontal axis (Y) and one vertical axis (X) by handling means, the said satellite unit including its own movement means able to interact with guidance means, in such a way as to allow the satellite unit to move along at least one horizontal axis (Z). independently with respect to the handling means, the said guidance means being able to guide the satellite unit between the handling means and the said stations along said at least one horizontal axis (Z), all of the handling means, the guidance means, said at least one satellite unit and the containers being arranged in the technical areas, and a system able to manage all the movements of the handling means of the at least one satellite unit and of the containers.

2. An installation according to claim 1, wherein the handling means includes at least one lifting hoist including a carriage able to move vertically, the said lifting hoist being able to run along a guide element.

3. An installation according to claim 1, wherein the said handling means includes at least one fixed lifting hoist and includes several horizontal transport means arranged on different storeys.

4. An installation according to claim 1, wherein the at least one satellite unit includes means for gripping the containers and the containers include suspension means able to interact with the said gripping means.

5. An installation according to claim 1, wherein the feed stations, by which the product contained in a container is transferred to a processing or weighing premises, are located in the ceiling of the processing premises and the reception stations, by which the produce is transferred from the processing or weighing premises to a container, are located in the floor of the processing premises.

6. An installation according to claim 5, characterized in that reception stations include hooking devices able to interact with suspension devices of a container so as to maintain the latter in position under the station.

7. An installation according to claim 5, wherein some of the containers include an upper orifice able to be engaged in reception stations and a lower orifice able to be engaged in feed stations.

8. An installation according to claim 5 wherein some of the containers are reversible and include a single orifice able to be engaged in reception stations and in feed stations.

9. An installation according to claim 1, which further includes parking zones, where one or more containers are placed on standby.

10. An installation according to claim 1 wherein the handling means includes a double rail which is able to interact with the satellite unit.

11. An installation according to claim 1 wherein the handling means includes forks able to transport the at least one satellite unit.

12. An installation according to claim 1 wherein, in addition to the at least one satellite unit, the handling means is able to transport pallets, simultaneously or individually.

13. An installation according to claim 1, which includes a system for positioning the containers with respect to the stations.

14. An installation according to claim 1, wherein said system able to manage all the movements is a computerized magnagements system.

15. A device able to move independently, including means for gripping a container for products flowing by gravity and including a cage open at its lower and upper parts, and at least at one of its lateral sides, and including a vertical translation device able to raise or lower the container, wheels drivable by a drive system and an actuation system carried on board the device itself.

16. A device according to claim 15, wherein the vertical translation device includes:

worm screws drivable by a motor and a drive mechanism assembly, and a chassis equipped with the said means for gripping a container and able to move vertically along the worm screws.

17. A device according to claim 15 which includes two sets of said wheels allowing said device to move along two different horizontal axes (Y, Z).

18. A device according to claim 15 which is powered by a battery installed on board the device itself.

19. A device according to claim 15 which is powered electrically from wipers sliding along an electrical power supply rail.

20. An automated installation for transporting containers for products flowing by gravity, which is intended for a multi-storey production factory, wherein the said installation includes:

containers provided with at least one closable orifice, stations for contamination-free transfer of the products, at least one satellite unit able to move independently including a cage the shape of which is a parallelepiped, open at its lower and upper parts, and at least at one of its lateral sides, the said satellite unit being able to carry, raise and lower a container by virtue of a vertical translation device, in such a way as to allow the containers to be coupled to the said stations, guidance means able to guide the satellite unit towards the said stations along a horizontal axis (Z), handling means able to carry and to transport a satellite unit, along at least one horizontal axis (Y) and along a vertical axis (X) towards a chosen position, a computerized management system able to manage all the movements of the handling means of the at least one satellite unit and of the containers, the handling means including at least one lifting hoist including a carriage able to move vertically, the said at least one satellite unit including an actuation system carried on board the device itself and at least one set of wheels drivable by a drive system allowing the satellite unit to move along at least one horizontal axis (Y, Z).

* * * * *